Figure 1:
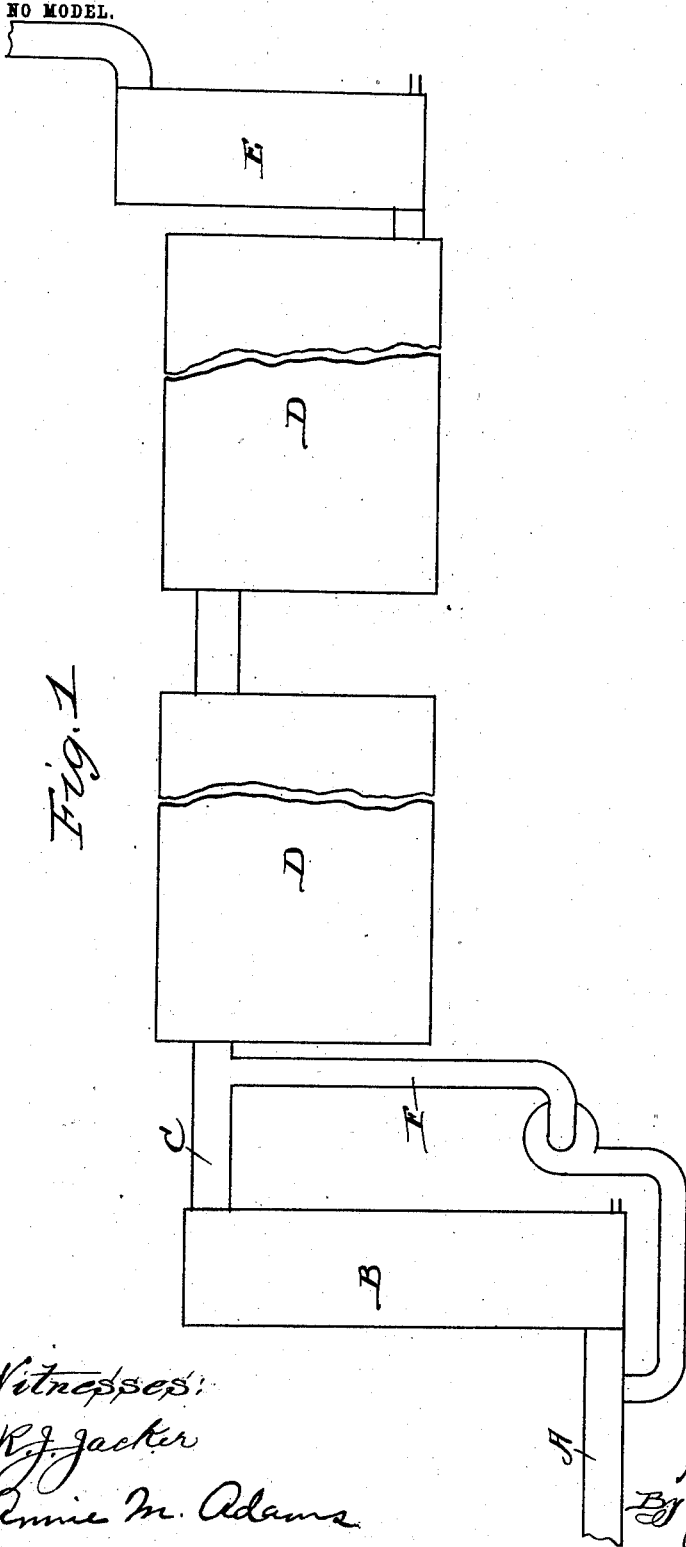

No. 752,677. PATENTED FEB. 23, 1904.
H. HEGELER & N. HEINZ.
PROCESS OF MAKING SULFURIC ACID.
APPLICATION FILED MAY 26, 1902.
NO MODEL. 2 SHEETS—SHEET 1.

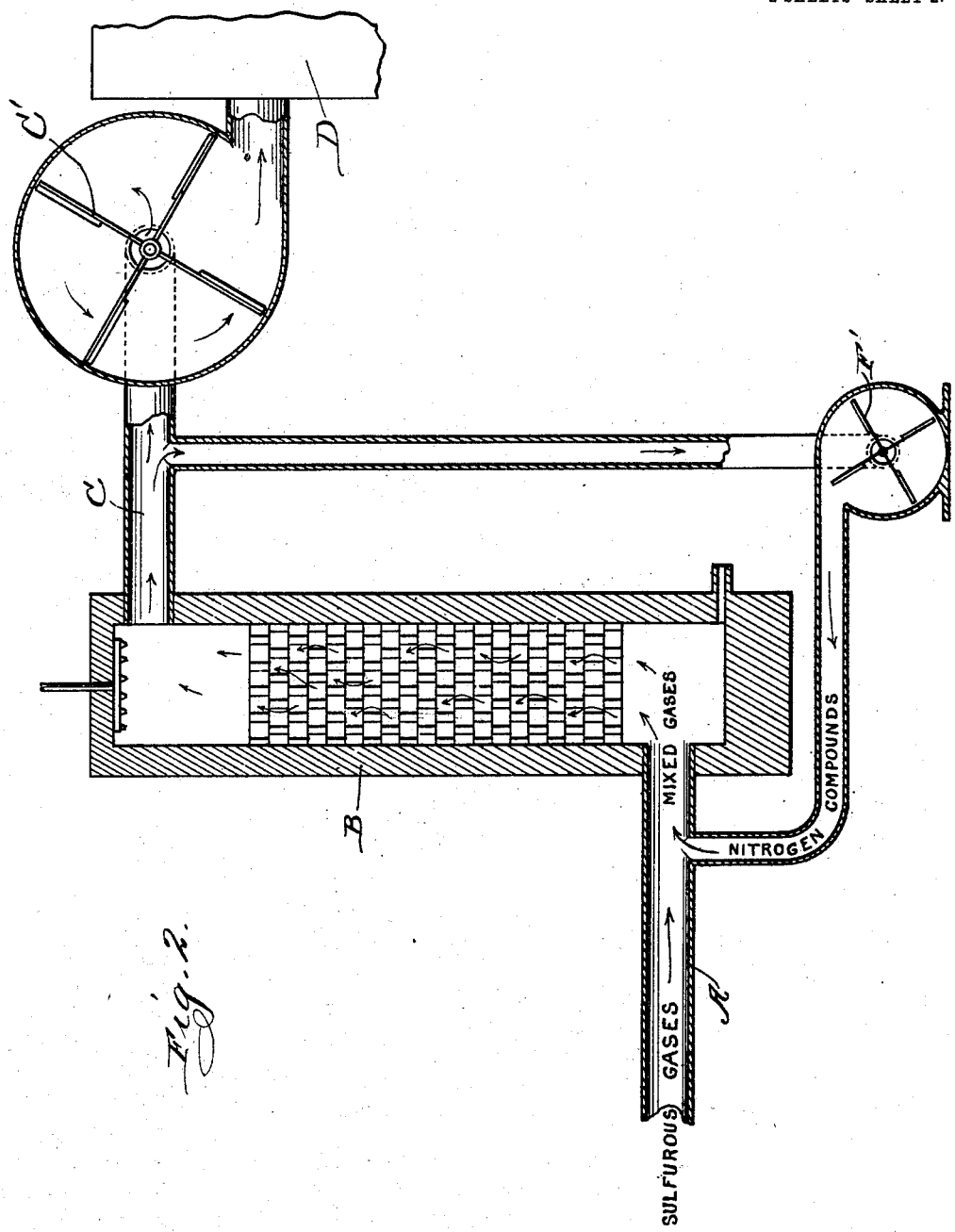

No. 752,677.

Patented February 23, 1904.

UNITED STATES PATENT OFFICE.

NICHOLAS HEINZ AND HERMAN HEGELER, OF LASALLE, ILLINOIS.

PROCESS OF MAKING SULFURIC ACID.

SPECIFICATION forming part of Letters Patent No. 752,677, dated February 23, 1904.

Application filed May 26, 1902. Serial No. 108,908. (No specimens.)

*To all whom it may concern:*

Be it known that we, NICHOLAS HEINZ and HERMAN HEGELER, of Lasalle, Illinois, have invented certain new and useful Improvements in Processes for the Manufacture of Sulfuric Acid, of which the following is a specification.

The invention is an improvement upon what is generally known as the "Glover tower" process, which is carried out in an apparatus consisting of a Glover tower, leaden chambers, and Gay-Lussac tower, connected in a flue-like system and attached to a sulfur-burner, all of such well-known construction and operation as not to require specific description. In this process the purpose of the Gay-Lussac and Glover towers is to return the nitrogen compounds passing out of the leaden chambers and mix them with the fresh sulfurous gases entering the chambers. The Glover tower also acts as a concentrator and is a source of steam for the chamber process. In the apparatus the nitrous vitriol flowing from the bottom of the Gay-Lussac tower is showered into the top of the Glover tower, and owing to the heat of the ascending sulfurous gases and the dilution and heating of the descending nitrous acid all the nitrogen compounds are liberated in the upper part of the Glover tower and pass with the sulfurous gases and vapor upward and out of the tower to the leaden chambers. As no nitrogen compounds reach the lower part of the tower, no sulfuric acid is made there—that is, no oxidizing of the sulfurous gases can take place there. The operation in the lower part of the tower is to concentrate or evaporate the water from the acid. With the strength the boiling-point of sulfuric acid rises very rapidly. According to Lunge, that of 52° Baumé acid is about 158° centigrade, that of 60° Baumé about 200° centigrade, that of 65.9° Baumé 297°, and that of monohydrate 338° centigrade. The descending acid as it gives up its water increases in strength, grows hotter and hotter, and if the Glover tower be adjusted so that the acid flowing from the bottom of the tower is above 62° Baumé it is so hot that the lining and filling of the tower are soon destroyed. For this reason it is impractical to make the stronger acids in the Glover tower, and specially-constructed towers and glass or platinum vessels are used for this purpose; but they are all troublesome and expensive.

The object of our improvement is to make the whole of the Glover tower a sulfuric-acid-making part of the apparatus, to make the strongest sulfuric acid free from nitrogen compounds therein without increasing the strain on the apparatus and without increasing the niter consumption, and at the same time correspondingly reduce the required amount of chamber-space. To this end we propose to have a large proportion of nitrogen compounds to sulfurous compounds present throughout the full height of the Glover tower to avoid excessive temperatures at the bottom of the tower, to produce a more uniform temperature throughout the tower, to secure better mixing of the nitrogen compounds and the sulfurous compounds and greater activity thereof, and to have the molecule of nitrogen compound do service many times before passing on to the chambers and to the Gay-Lussac tower.

The accompanying drawings illustrate an apparatus by means of which our improved process may be carried out, in which the nitrogen compounds are taken from the Glover tower or any part of the system beyond and are returned to the bottom by a conduit provided with suitable forcing means and are mixed with the gases entering the Glover tower from the burners.

Figure 1 is a diagrammatic view representing in side elevation an apparatus having towers, chambers, and a fragment of the flue from the burners (not shown) all of ordinary construction and in connection therewith an additional conduit and blower for taking the nitrogen compounds from flue at the top of the tower and returning them as indicated. Fig. 2 is a fragmentary view showing a central vertical section through the Glover tower in the plane of the flues at the bottom and top thereof.

In the drawings, A designates the flue leading from the burners, which are not shown, to the Glover tower B.

C is a flue leading from the top of the tower

B to the chambers D and thence on to the Gay-Lussac tower E.

The flue A, conveying the sulfurous gases from the burners, enters the Glover tower at the bottom, so as to deliver these gases into the tower at the bottom.

F is a flue which communicates with the flue C at the top of the Glover tower and with the flue A near its connection with the bottom of the tower. The flue F is provided with a fan F' near the bottom of the tower, by means of which some of the gases containing nitrogen compounds passing from the top of the tower is drawn off and forced into the flue A at the bottom, so as to mix with the sulfurous gases coming from the burners as they enter the tower.

C' is a fan in the flue C near its entrance into the leaden chamber D and is a common expedient for promoting or maintaining a regular through-draft in the system.

The proper working of the Glover tower requires that the ascending gases take a zigzag course through the filling—that is, meet with resistance in their passage. Increasing the volume of gases passing through the tower at a given time obviously increases the resistance with the square, and the speed of the fan C' in the flue C may be increased to overcome the increased resistance of the Glover tower and retain the regular through-draft of the system. The effect of thus mixing the gases at the bottom of the tower would be the same if the flue F were connected with the system beyond the flue C and communicated directly with the bottom of the Glover tower rather than with the flue A. In consequence of the large proportion of nitrogen compounds present through the full height of the Glover tower the reaction can be increased, so that sufficient $SO_3$ can be made therein to combine with all the water of the descending acid, and little or no evaporation will take place in the tower, and the strongest acid can be made in the tower without the excessive heat required for evaporation. When 60° Baumé acid is made in the Glover tower by the old process, the temperature of the acid flowing from the tower lies between 130° and 150° centigrade. By our improved process 66° Baumé, or one hundred per cent. $H_2SO_4$, acid can be made in the Glover tower without going beyond this temperature. In other words, the old process consists in denitrating sulfuric acids in the top of the tower and concentrating the acid by evaporating the water out of it in the lower or remaining portion of the tower, whereas by the improved process we denitrate in the top of the tower and increase the strength of the descending acid not by evaporation, but by the addition of $SO_3$ made in the tower by the reaction resulting from the introduction and mixing of the nitrogen compounds with the sulfurous gases coming from the burner in the manner described.

What we claim is—

An improvement upon the Glover process for the manufacture of sulfuric acid which consists in returning nitrogen compounds from any part of the system and introducing and mixing them with the sulfurous gases entering the Glover tower, as specified.

NICHOLAS HEINZ.
HERMAN HEGELER.

Witnesses:
   JOS. BRENNEMANN,
   ED SCHUELER.